United States Patent
Pan et al.

(10) Patent No.: US 9,437,243 B1
(45) Date of Patent: *Sep. 6, 2016

(54) METHOD OF GENERATING HIGHLIGHTS FOR LIVE VIDEOS

(71) Applicant: CARNEGIE TECHNOLOGY INVESTMENT LIMITED, Tortola (GB)

(72) Inventors: Chongguang Pan, Dalian (CN); Bingyu Li, Dalian (CN)

(73) Assignee: CARNEGIE TECHNOLOGY INVESTMENT LIMITED, Tortola (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/630,612

(22) Filed: Feb. 24, 2015

(51) Int. Cl.
*H04N 9/80* (2006.01)
*G11B 27/00* (2006.01)

(52) U.S. Cl.
CPC .................................. *G11B 27/002* (2013.01)

(58) Field of Classification Search
USPC .................... 386/223–224, 239–241, 248
See application file for complete search history.

(56) References Cited

U.S. PATENT DOCUMENTS

| | | | |
|---|---|---|---|
| 2003/0177503 A1* | 9/2003 | Sull | G06F 17/30796 725/112 |
| 2009/0279839 A1* | 11/2009 | Nakamura | G11B 20/10 386/248 |
| 2010/0278509 A1* | 11/2010 | Nagano | H04N 9/8227 386/230 |
| 2011/0280545 A1* | 11/2011 | Kates | H04N 5/76 386/235 |
| 2015/0312652 A1* | 10/2015 | Baker | H04N 21/8549 386/281 |

* cited by examiner

*Primary Examiner* — Nigar Chowdhury
(74) *Attorney, Agent, or Firm* — Leong C. Lei

(57) ABSTRACT

A method of generating highlights for live videos includes steps of setting a rule for inserting an out point, inserting an in point when a highlight picture appears, automatically finding out the rule whereby the out point is inserted, calculating a position where the out point is inserted to form a highlight segment record, loading the highlight segment record into a standby list, and searching the needed highlight segment record when the playback is in action to find the corresponding game video and a start position and an end position of a highlight segment. Therefore, steps for generating highlights can be reduced, and incorrect operations caused by human error can be effectively decreased.

1 Claim, No Drawings

METHOD OF GENERATING HIGHLIGHTS FOR LIVE VIDEOS

TECHNICAL FIELD OF THE INVENTION

This invention relates particularly to a method of generating highlights for live videos.

DESCRIPTION OF THE PRIOR ART

When there is a live sport game, multiple cameras and video recorders are used to collect on-site videos at many viewpoints simultaneously, and the broadcasting site switches and replays highlights, i.e., highlight video chips or highlight reels, made by the above video sources. Editors inspect the collected video sources, make an insertion of an in point when a highlight picture appears and an insertion of an out point when the highlight picture finishes in order to store highlight video segments, and input an address and a name to be recorded in order to form a key word index. If the live broadcast needs the playback, the corresponding video is searched and found. If the editor forgets to insert the out point, the traditional device keeps recording until the device runs out of its resources. Further, the highlight video segment is captured and stored, so the highlight segment cannot be adjusted forward or backward according to needs of users when the playback is in action. This brings the worse flexibility.

SUMMARY OF THE INVENTION

It is an object of this invention to provide a method of generating highlights for live videos which reduces steps of generating highlight segments, allowing a forward or backward adjustment of the start position or the end position of the highlight segment according to needs at the time of playback, largely reducing the manpower involved in collecting videos at multiple viewpoints for the live broadcast, and decreasing incorrect operations caused by human error effectively.

The method of generating highlights for live videos in accordance with this invention comprises following steps:

step 1 for setting a rule for inserting an out point and setting different time durations or a single time duration according to a real situation of a game;

step 2 for collecting at least one channel of a game video;

step 3 for inspecting the collected game video and inserting an in point when a highlight picture appears;

step 4 for automatically finding out the rule whereby the out point is inserted and getting corresponding time duration data according to the chosen rule;

step 5 for calculating a position where the out point is inserted according to the time duration data and a position of the in point to form a highlight segment record, wherein the record at least includes a game video name and time position information of the in point and the out point in the game video;

step 6 for setting a file name for the highlight segment record and loading the highlight segment record into a standby list prepared for a playback; and step 7 for searching the needed highlight segment record from the standby list as the playback is in action, getting contents stored in the record, and finding the corresponding game video and a start position and an end position of a highlight segment. The start position and the end position of the highlight segment can be adjusted slightly forward or backward according to needs in a live broadcast.

If the step 6 sets the file name for the highlight segment record automatically, the step 1 should connect a game information system and preset a file name generating strategy. In the step 6, the game information system provides messages about people and motions according to a development of the game, and the file name of the highlight segment record is automatically generated according to the messages in combination with the preset file name generating strategy.

By adopting the above method, this invention discloses that the highlight segment prepared for the playback is not the independent stored video data captured from the game video. This invention records the start time and the end time of the highlight segment in the game video directly. The end time can be automatically generated according to the preset rule which inserts the out point, so steps of generating the highlight video segment can be largely reduced, and the manpower involved in the live broadcast can be effectively reduced. This invention keeps storing video signals during the live broadcast. Thus, when the playback needs the highlight segment, this invention acquires the game video name and the information of the start time and the end time of the highlight segment in the game video instead of adopting video data practically stored. The start position and the end position of the highlight segment are capable of being adjusted slightly forward or backward according to needs in the live broadcast. The broadcasting site can also decide when to switch to other input signals. Therefore, the occurrence of a blank screen caused by a switching delay is prevented, and incorrect operations caused by human error are also decreased effectively. The traditional method which stores highlights independently does not have video data when the record is past the end point, and the blank screen appears when the end point of the record is not switched to other input signals This leads to a broadcast accident. Furthermore, the recorded highlight of the traditional method can only adjust contents of the live broadcast backward from the start position of the highlight and forward from the end position thereof. Therefore, the operator is required to pay high attention to his work. If there are errors in the record, the time point for playing cannot be adjusted freely and cannot satisfy the needs, and the flexibility may become worse. In addition, it is not suitable for the operator responsible for recording the highlight to insert the in point and the out point for multiple game videos at the same time. Therefore, the manpower involved in the traditional method is largely increased.

DETAILED DESCRIPTION OF THE PREFERRED EMBODIMENTS

The method of generating highlights for live videos of this invention comprises following steps:

Step 1 for setting a rule for inserting an out point by, for example, setting different time durations or a single time duration according to a real situation of a game.

Step 2 for collecting at least one channel of a game video.

Step 3 for inspecting the collected game video and inserting an in point when a highlight picture appears.

Step 4 for automatically finding out the rule whereby the out point is inserted and getting corresponding time duration data according to the chosen rule.

Step 5 for calculating a position where the out point is inserted according to the time duration data and a position of the in point in order to form a highlight segment record. The record at least includes a game video name and time position information of the in point and the out point in the game video.

Step 6 for setting a file name for the highlight segment record manually or automatically and loading the highlight segment record into a standby list prepared for a playback.

For setting the file name for the highlight segment record automatically, the step 1, preferably, connects a game information system which provides messages about people and motions according to a development of the game. By combining the messages with a preset file name generating strategy, the file name of the highlight segment record is automatically generated.

Step 7 for searching the needed highlight segment record from the standby list when the playback is in action, getting contents stored in the record, and finding the corresponding game video and a start position and an end position of a highlight segment. The start position and said end position of said highlight segment can be adjusted slightly forward or backward according to needs in a live broadcast. To facilitate a video switching action in the live broadcast, a countdown timer can be set at the end position of the highlight segment.

The feature of this invention is that the highlight segment prepared for the playback is not independent stored video data captured from the game video. This invention records the start time and the end time of the highlight segment in the game video directly. The end time can be automatically generated according to the preset rule whereby the out point is inserted, so steps of generating the video highlight can be largely reduced, and the manpower involved in the live broadcast can be effectively reduced. This invention keeps storing video signals during the live broadcast. Therefore, when the highlight segment is used for the playback, this invention acquires the game video name and the information of the start time and the end time of the highlight segment in the game video instead of adopting the video data practically stored. The start position and the end position of the highlight segment can be adjusted slightly forward or backward according to needs in the live broadcast. The broadcasting site can also decide when to switch to other input signals. Therefore, the occurrence of a blank screen caused by a switching delay is prevented, and incorrect operations caused by human error are decreased effectively. The traditional method which stores the highlight video segment independently does not have video data when the record is past the end point, and the blank screen appears if the end point of the record is not switched to other input signals. This incurs a broadcast accident. Further, the highlight segment recorded by the traditional method can only adjust contents of the live broadcast backward from the start position of the highlight segment and forward from the end position thereof. Thus, the operator is required to pay high attention to his work. If the record has errors, the time point for playing cannot be adjusted freely and cannot satisfy needs, and the flexibility may become worse. Further, it is not suitable for the operator who records the highlight segment to insert the in point and the out point for multiple game videos concurrently. Thus, the manpower of the traditional method is largely increased.

While the embodiments of this invention are shown and described, it is understood that further variations and modifications may be made without departing from the scope of this invention.

We claim:

1. A method of generating highlights for live videos comprising:
    step 1 for setting a rule for inserting an out point and setting different time durations or a single time duration according to a real situation of a game;
    step 2 for collecting at least one channel of game videos;
    step 3 for inspecting said game video which is collected and inserting an in point when a highlight picture appears;
    step 4 for automatically finding out said rule whereby said out point is inserted and getting corresponding time duration data according to said rule which is selected;
    step 5 for calculating a position where said out point is inserted according to said time duration data and a position of said in point to form a highlight segment record, wherein said record at least includes a game video name and time position information of said in point and said out point in said game video;
    step 6 for setting a file name for said highlight segment record and loading said highlight segment record into a standby list prepared for a playback; and
    step 7 for searching said highlight segment record which is needed from said standby list as said playback is in action, getting contents stored in said record, and finding said corresponding game video and a start position and an end position of a highlight segment, said start position and said end position of said highlight segment being capable of being adjusted slightly forward or backward according to needs in a live broadcast;
    wherein said step 1 further connects a game information system and presets a file name generating strategy if said step 6 sets said file name for said highlight segment record automatically, in said step 6, said game information system providing messages about people and motions according to a development of said game, said file name of said highlight segment record being automatically generated according to said messages in combination with said preset file name generating strategy.

* * * * *